US006251044B1

(12) United States Patent
Streib

(10) Patent No.: US 6,251,044 B1
(45) Date of Patent: Jun. 26, 2001

(54) METHOD AND ARRANGEMENT FOR CONTROLLING A DRIVE UNIT OF A MOTOR VEHICLE

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/374,118

(22) Filed: Aug. 16, 1999

(30) Foreign Application Priority Data

Aug. 14, 1998 (DE) ........................................ 198 36 845

(51) Int. Cl.[7] ........................................ F16H 59/48
(52) U.S. Cl. ........................ 477/120; 123/350; 123/399; 477/115
(58) Field of Search ........................ 477/120, 110, 477/115, 111, 112; 123/350, 351, 352

(56) References Cited

U.S. PATENT DOCUMENTS 5,692,471 * 12/1997 Zhang ........................ 123/350
5,692,472 12/1997 Bederna et al. ........................ 123/350
5,782,221 * 7/1998 Woldt ........................ 123/436
6,029,625 * 2/2000 Bischof et al. ........................ 123/399

FOREIGN PATENT DOCUMENTS 63-109264 5/1988 (JP) .

* cited by examiner

*Primary Examiner*—Sherry Estremsky
*Assistant Examiner*—Tisha D. Lewis
(74) *Attorney, Agent, or Firm*—Walter Ottesen

(57) ABSTRACT

A method and an arrangement for controlling a drive unit of a motor vehicle wherein at least one of the following quantities is determined: torque, power or throttle flap angle. This quantity is compared to the maximum permissible value and, when the maximum permissible value is exceeded by the determined quantity, fault reaction measures are initiated. The maximum permissible value is formed in dependence upon the time-dependent change of the rpm of the drive unit.

7 Claims, 3 Drawing Sheets

METHOD AND ARRANGEMENT FOR CONTROLLING A DRIVE UNIT OF A MOTOR VEHICLE

FIELD OF THE INVENTION

The invention relates to a method and an arrangement for controlling a drive unit of a motor vehicle.

BACKGROUND OF THE INVENTION

U.S. Pat. No. 5,692,472 discloses that a maximum permissible engine torque or a maximum permissible engine power is derived on the basis of at least one operating variable, for example, the accelerator pedal position. This maximum permissible engine torque or maximum permissible engine power is compared to the actual torque or the actual power of the drive unit. Fault reaction measures are initiated when the actual value exceeds the maximum permissible value. These measures can include switching off the metering of fuel until the actual value again drops below the maximum permissible value.

With the monitoring measures described, there is a conflict of objectives with respect to the functionality of the drive unit and the precision of the described monitoring. At least in some operating states such as when the accelerator pedal is in the idle position, a relatively large torque or a relatively large power must be permitted so that the idle control can compensate for disturbance quantities such as a switched-in climate control compressor, a steering-assist pump or a grinding of the clutch. In such operating situations, the maximum permissible values must be set to values which can already lead to an unwanted acceleration of the vehicle in the case of a fault.

SUMMARY OF THE INVENTION

It is an object of the invention to solve the above target conflict or conflict of objectives.

The method of the invention is for controlling a drive unit of a motor vehicle and the method includes the steps of: detecting the rpm (Nmot) of the drive unit and forming the time-dependent change (dNmot/dt) of the rpm (Nmot); determining at least one quantity of the following quantities: torque, power or throttle flap angle; determining the maximum permissible value of the at least one quantity while considering the time-dependent change (dNmot/dt) of the rpm (Nmot) of the drive unit; and, initiating a fault reaction measure when the at least one quantity exceeds the maximum permissible value.

The described target conflict between the functionality of the drive unit and the precision of the monitoring is successfully solved. It is especially advantageous that in operating situations, in which a relatively high permissible value must be pregiven in order to prevent an unintended response of the monitoring function, a permissible value is pregiven which is greater compared to other operating situations without it leading to an unwanted acceleration of the vehicle in the case of a fault.

It is especially advantageous to tie in the time-dependent change of the engine rpm when determining the permissible value. This is so, because, in this way, and for a negative time-dependent change, an increase of the permissible value can be undertaken whereas, for an increasing or constant rpm, a relatively low permissible value is pregiven. In the case of a fault, unwanted accelerations are substantially prevented because, as a rule, a falling rpm precludes unwanted accelerations. Accordingly, when disturbance quantities such as climate control compressor, power steering, clutch actuation, et cetera lead to a sudden drop in rpm, the idle control effectively compensates this drop without the monitoring function responding.

It is advantageous to allow the increase of the permissible value only in specific operating situations and especially only when the accelerator pedal is in the idle position (released).

It is especially advantageous to maintain the increase of the permissible value for negative rpm changes for a pregiven time span after the end of the drop in rpm because, in this way, the idle control can control the rpm very rapidly to the pregiven value after the drop in rpm.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
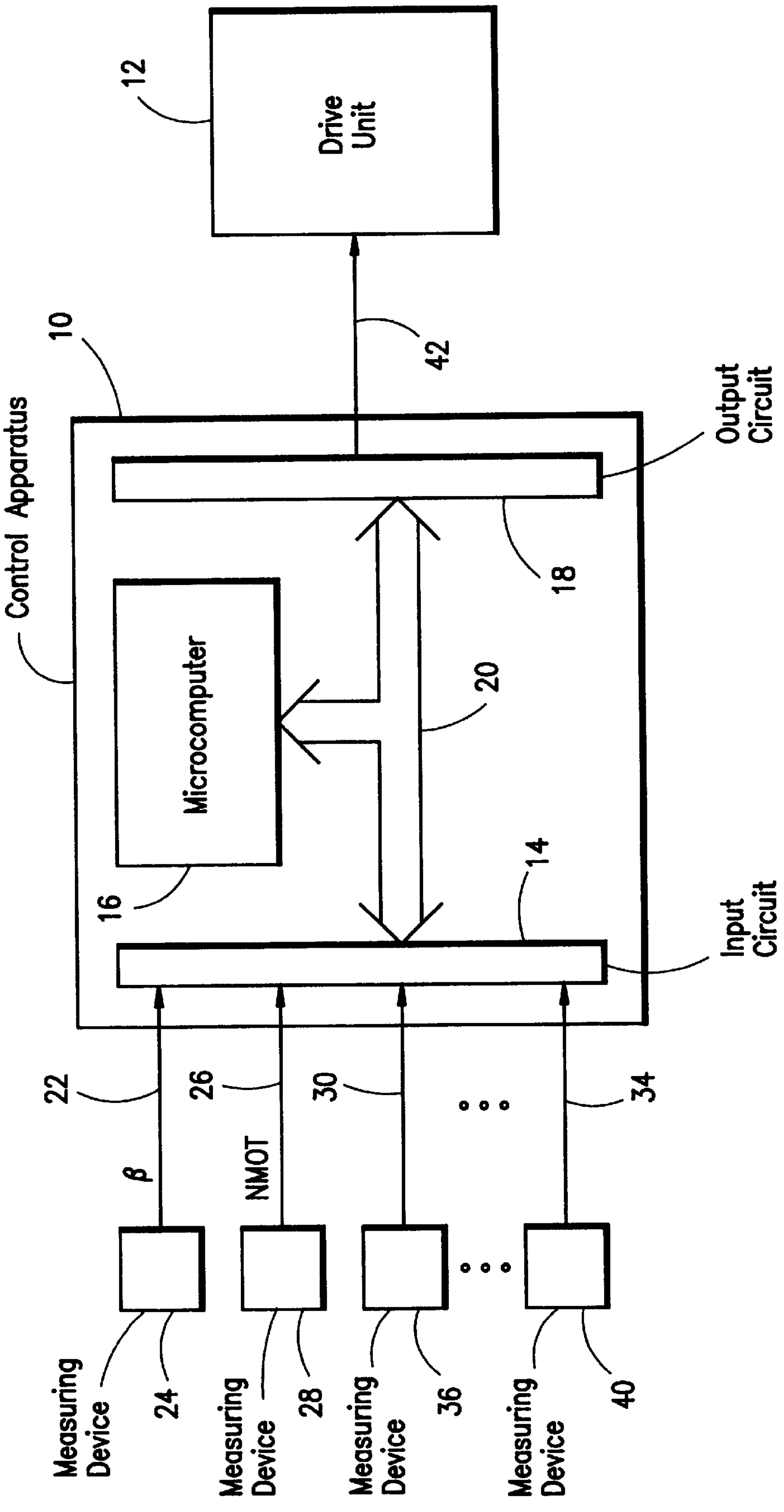
FIG. 1 shows a control arrangement for a drive unit wherein the procedure described hereinafter is realized.

FIG. 1 shows a control apparatus 10 for a drive unit 12. The control apparatus essentially comprises an input circuit 14, a microcomputer 16, an output circuit 18 and a communication system 20 connecting these elements. Operating variables of the drive unit and/or of the vehicle are supplied via input lines to the control apparatus 10. The operating variables are converted in the control apparatus 10 by the microcomputer into drive signals for controlling the drive unit 12. The following input quantities are provided especially with respect to the solution described hereinafter.

The control apparatus 10 is supplied via input line 22 from a measuring device 24 with a quantity $\beta$ representing the deflection of the accelerator pedal. Furthermore, a quantity NMOT, which represents the engine rpm, is transmitted from a corresponding measuring device 28 via the line 26. Furthermore, input lines 30 to 34 are provided which supply additional quantities from corresponding measuring devices 36 to 40. These operating quantities are useful in the execution of the solution described hereinafter as well as for other functions in the context of the operation of the control apparatus 10. Quantities of this kind include, for example, an air-mass signal, an engine temperature signal, a throttle flap position signal, et cetera.

In a preferred embodiment, the control apparatus 10 controls the power of the drive unit 12, for example, by adjusting the air supply, the fuel injection and/or the ignition angle in dependence upon the supplied input quantities. These interventions are symbolized in FIG. 1 by the output line 42.

In a preferred embodiment, the control apparatus 10 defines a torque-based engine control system. This means that a desired torque of the drive unit is determined at least on the basis of the accelerator pedal position. This desired torque is adjusted by controlling at least one of the power parameters of the drive unit. In an internal combustion engine and for adjusting the air supply, a desired throttle flap angle is derived on the basis of the desired torque and is adjusted to this desired value in the context of a position control loop.

In other embodiments, it is not the torque of the engine which is pregiven but the power of the engine or the throttle flap angle. Depending upon the embodiment, a maximum permissible torque, a maximum permissible power, or a maximum permissible throttle flap angle is determined at least on the basis of the accelerator pedal deflection for monitoring the engine control. The corresponding actual quantity is compared to this maximum permissible torque. A fault reaction measure is initiated when this maximum permissible torque is exceeded. This can take place, for example, with a switchoff of the fuel injection.

The conflict between the requirements of the idle control and the monitoring precision is solved in that the maximum permissible value is dependent upon the time-dependent change of the engine rpm. In the preferred embodiment, this takes place when the pedal is in the idle position. For a negative rpm change, a higher maximum value is permitted than for a constant and even for a positive rpm change. In a further advantageous embodiment, the higher maximum permissible value is still pregiven after a negative rpm gradient for a pregiven time duration (for example, 200 to 500 milliseconds) even if the rpm is already increasing.

Depending upon the embodiment, the maximum permissible value is a maximum permissible torque, a maximum permissible power or a maximum permissible throttle flap angle. A corresponding actual value (that is, a torque actual value, a power actual value, or a throttle flap angle actual value) is compared to this maximum permissible value. This actual value can be either computed or measured.

Figure 2:
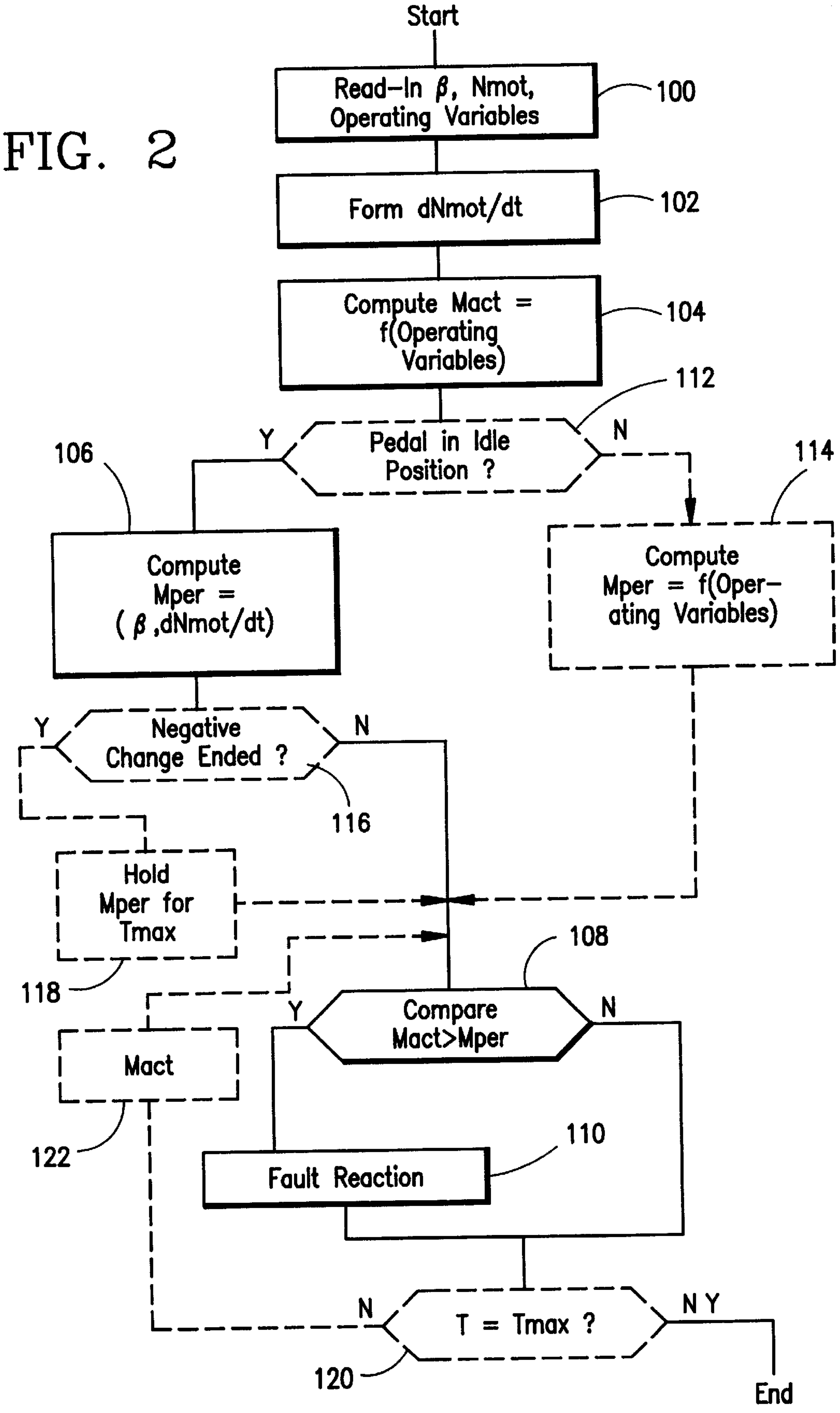
FIG. 2 is a flowchart which shows the realization of the described solution as a computer program.

Preferred embodiments of this solution are shown as a computer program on a torque basis in the flowchart of FIG. 2. The described program is started at pregiven time intervals. The advantageous supplements of the program are shown in phantom outline.

In the first step 100, the operating variables, which are to be evaluated, are read in. These are the following: engine rpm Nmot, accelerator pedal deflection β and, if required, other operating variables used for computing the maximum permissible torque or used for the computation of the actual torque. These operating variables include, for example, the actual air flow mass, the actual ignition angle setting, et cetera.

In the next step 102, the gradient of the engine rpm is formed by evaluating the actual engine rpm value NMOT and at least one previous engine rpm value. This gradient of the engine rpm is the time-dependent change of the engine rpm dNMOT/dt.

In the next step 104, the engine actual torque Mact is determined on the basis of the operating variables as they are known from the state of the art. Thereafter, in step 106, the computation of the maximum permissible torque Mper is carried out at least on the basis of the accelerator pedal deflection β and the time-dependent change of the engine rpm dNmot/dt.

In one embodiment, this takes place in that the maximum permissible torque is determined on the basis of a characteristic line or on the basis of an engine-rpm dependent characteristic field. An increase value is superposed onto the maximum permissible torque when there is a negative time-dependent rpm change. This increase value can be fixed or it can be dependent upon the magnitude of the time-dependent change of the engine rpm. The increase value is zero if the engine rpm is constant or if the engine rpm changes in a positive sense, that is, in the sense of an increase of the engine rpm.

After the determination of the maximum permissible torque, the computed actual torque is compared to the maximum permissible torque in step 108. If the actual torque exceeds the maximum permissible torque, then and in accordance with step 110, a fault reaction is initiated; otherwise, the subprogram is ended with step 110 and the subprogram is run through at the next time point. The fault reaction is defined by one of the following: a power reduction via an adjustment of the throttle flap, at least a partial cutoff of the fuel injection and by a retardation of the ignition angle.

A first advantageous further development is presented in steps 112 and 114. After computing the actual torque in step 104, a check is made in step 112 as to whether the accelerator pedal is in the idle position, that is, whether it has been fully pulled back. If this is the case, the computation of the maximum permissible torque is carried out in accordance with step 106; otherwise, in accordance with step 114. In the last step, the maximum permissible torque Mper is solely dependent upon the deflection of the accelerator pedal and is determined from a characteristic line or an rpm-dependent characteristic field. After step 114, the program continues with a comparison in accordance with step 108. This solution affords the advantage that the time-dependent change of the engine rpm is only considered for the determination of the maximum permissible torque when the above-mentioned target conflict actually occurs, namely, in the interplay of the monitoring with the idle control.

A further advantageous embodiment results from the steps 116, 118, 120 and 122. After computing the maximum permissible torque Mper while considering the time-dependent change of the engine rpm in step 106, an inquiry is made in step 116 as to whether the negative change of the engine rpm is ended. If this is the case, then the increased maximum permissible torque, which is computed in step 106, is maintained for a predetermined time Tmax in accordance with step 118. Thereafter, the program continues with step 108. In step 120, a check is made as to whether the counter has reached its maximum value Tmax. The counter is started in accordance with step 118 with a yes answer in step 116. If this is not the case, the program is repeated with step 108. An instantaneous actual torque computation (step 122) takes place. If the maximum value is reached, then the program is ended and started anew at the next time interval.

Figure 3A:
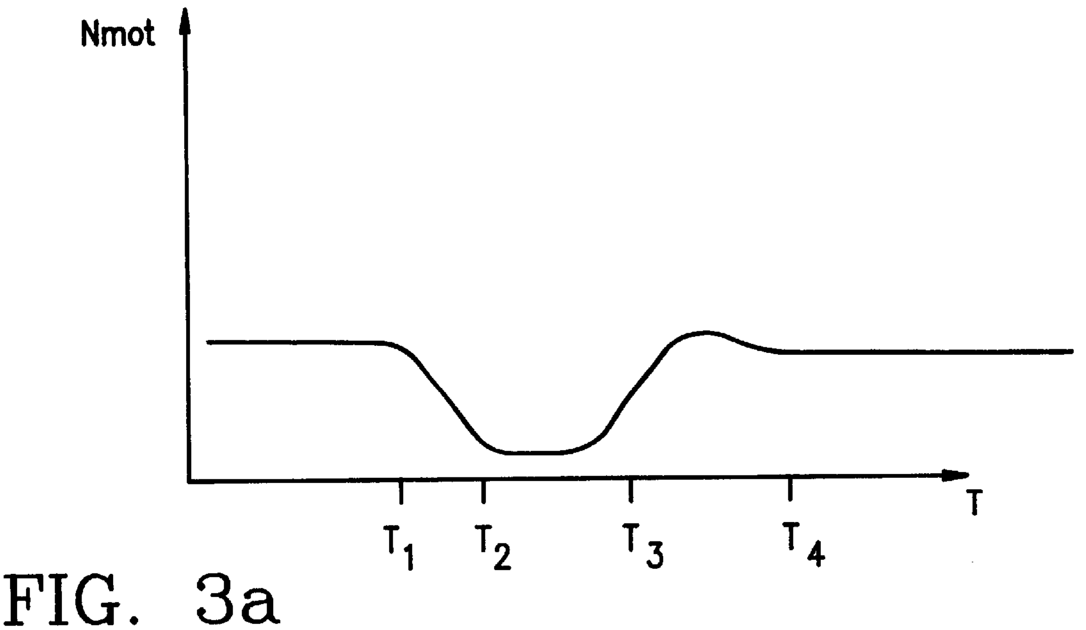
FIG. 3*a* shows a plot of the engine speed as a function of time.
Figure 3B:
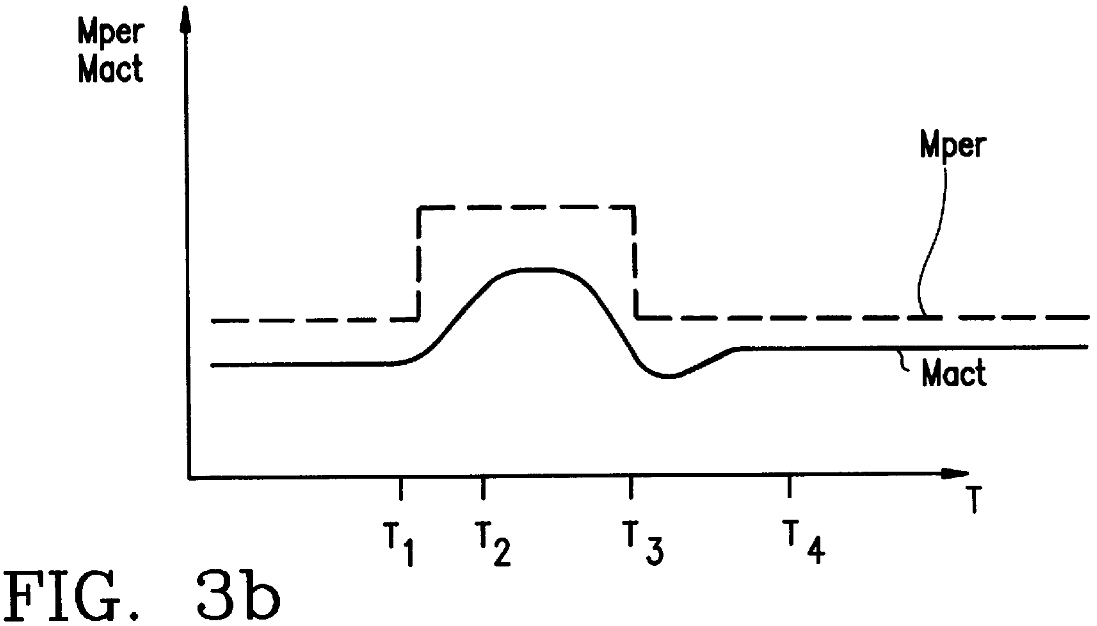
FIG. 3*b* shows a plot of the permissible and actual torques both as functions of time.

The functioning of this procedure is shown in FIGS. 3*a* and 3*b*. FIG. 3*a* is shows the engine rpm Nmot as a function of time and FIG. 3*b* shows the actual torque Mact and the maximum permissible torque Mper plotted as a function of time.

A situation is shown for a released accelerator pedal wherein there is a drop in rpm as a consequence of a disturbance and this drop in torque is compensated by the idle rpm controller with a torque increase. Up to time point $T_1$ (see FIG. 3*a*), the drive unit runs at a predetermined engine rpm and a specific torque (see FIG. 3*b*) is generated. The maximum permissible torque (see FIG. 3*b*, broken line) is set to a specific value at least in dependence upon the accelerator pedal position. The engine rpm drops at time point $T_1$. The idle controller increases the torque for compensation. As a consequence of the solution according to the invention, the permissible torque is increased by a specific amount which is fixedly pregiven or is dependent upon the magnitude of the time-dependent change of the engine rpm. The idle controller increases the torque of the drive unit to compensate for the drop in rpm. The rpm drop is arrested (time point $T_2$). At this time point, a predetermined time starts to run during which the increase of the permissible torque is maintained. The rpm increases and the torque again decreases.

At time point $T_3$, the predetermined time has elapsed so that the permissible torque is again set to the original value.

At time point $T_4$, the drop in rpm is controlled out so that the rpm and the torque again assume steady-state values.

As shown in FIG. 3*b,* the target conflict between engine functionality and monitoring precision is solved by the increase of the maximum permissible torque during the negative rpm drop and, if necessary, for a predetermined time thereafter. A relatively precise monitoring is present outside of this operating range so that unwanted accelerations are substantially avoided. To compensate the drop in rpm, the idle rpm controller can increase the torque and exceed the original permissible torque without the monitoring responding in this operating region.

The solution of the invention takes place in an advantageous manner for applications in spark-ignited engines as well as for diesel engines or electric vehicles.

In addition to the computation of the monitoring on the basis of torque, the corresponding procedure takes place in other embodiments on the basis of power or on the throttle flap angle.

In the context of the embodiment shown, the torque is understood to be the internal torque generated by the internal combustion engine; that is, the torque generated by combustion. In other embodiments, the torque, which is outputted by the engine (combustion torque less inner friction losses) can form the basis of the torque monitoring.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit of a motor vehicle, the method comprising the steps of:

detecting the rpm (Nmot) of said drive unit and forming the time-dependent change (dNmot/dt) of said rpm (Nmot);

determining at least one actual quantity of the following actual quantities: torque (Mact), power or throttle flap angle;

determining a maximum permissible value of said at least one actual quantity in dependence upon said time-dependent change (dNmot/dt) of said rpm (Nmot) of said drive unit;

increasing said maximum permissible value when a negative time-dependent chance of said rpm of said drive unit is detected;

comparing the determined at least one actual quantity to said maximum permissible value; and, initiating a fault reaction measure when said at least one actual quantity exceeds said maximum permissible value.

2. The method of claim 1, wherein said motor vehicle includes an operator-actuated element; and, said maximum permissible value is at least dependent upon the position of said operator-controlled element actuated by the driver.

3. The method of claim 1, wherein said motor vehicle includes an operator-actuated element movable into an idle position; and, said method comprising the further step of only considering said time-dependent change (dNmot/dt) when said operator-actuated element is in said idle position.

4. The method of claim 1, comprising the further step of maintaining the increased maximum permissible value for a specific time duration after the end of said negative time-dependent change of said rpm of said drive unit.

5. The method of claim 1, comprising the further step of increasing said maximum permissible value by a fixed pregiven value when said negative time-dependent change occurs.

6. The method of claim 1, comprising the further step of increasing said maximum permissible value by a value dependent upon the magnitude of said time-dependent change of said rpm of said drive unit.

7. An arrangement for controlling a drive unit of a motor vehicle, the arrangement comprising:

sensing means for sensing the rpm (Nmot) of said drive unit; and, a control unit functioning to:

compute a time-dependent change (dNmot/dt) of said rpm (Nmot);

determining at least one actual quantity of the following quantities: torque, power or throttle flap angle;

determine a maximum permissible value of said at least one quantity in dependence upon said time-dependent change of said rpm of said drive unit;

increase said maximum permissible value when a negative time-dependent chance of said rpm of said drive unit is detected;

compare the determined at least one actual quantity to said maximum permissible value; and, initiate a fault reaction when said at least one actual quantity exceeds said maximum permissible value.

* * * * *

UNITED STATES PATENT AND TRADEMARK OFFICE

CERTIFICATE OF CORRECTION

PATENT NO. : 6,251,044 B1
DATED : June 26, 2001
INVENTOR(S) : Martin Streib

It is certified that error appears in the above-identified patent and that said Letters Patent is hereby corrected as shown below:

Column 5,
Line 47, delete "chance" and substitute -- change -- therefor.

Column 6,
Line 41, delete "chance" and substitute -- change -- therefor.

Signed and Sealed this

Eighteenth Day of February, 2003

JAMES E. ROGAN
*Director of the United States Patent and Trademark Office*